United States Patent [19]
Barron et al.

[11] Patent Number: 5,159,983
[45] Date of Patent: Nov. 3, 1992

[54] APPARATUS AND METHOD FOR CAPPING OIL OR GAS WELLS

[75] Inventors: Andrew R. Barron, Cambridge, Mass.; Dennis F. Cronin, Jr., Fredericksburg, Va.; Paul R. Manson, Croydon, N.H.

[73] Assignee: Arthur D. Little Enterprises, Inc., Cambridge, Mass.

[21] Appl. No.: 760,340

[22] Filed: Sep. 16, 1991

[51] Int. Cl.$^5$ ............... E21B 29/02; E21B 33/03; E21B 35/00; F16L 13/02

[52] U.S. Cl. ................................. 166/379; 166/57; 166/97; 166/302; 166/380; 285/21; 169/69

[58] Field of Search ............. 166/379, 380, 302, 297, 166/57, 97, 55, 77.5, 90, 96; 169/69; 285/21

[56] References Cited

U.S. PATENT DOCUMENTS

| | | | |
|---|---|---|---|
| 2,667,865 | 2/1954 | Herman | 285/21 X |
| 2,946,386 | 7/1960 | Jones | 166/75.1 X |
| 3,535,767 | 10/1970 | Doherty, Jr. et al. | 285/21 X |
| 3,948,434 | 4/1976 | Rothchild | 285/21 X |
| 4,224,989 | 9/1980 | Blount | 166/250 |
| 4,323,118 | 4/1982 | Bergmann | 166/97 X |
| 4,513,823 | 4/1985 | Hynes et al. | 166/97 X |

OTHER PUBLICATIONS

*Welding Handbook*, 8th ed., R. L. O'Brien, ed., vol. 2, Welding Processes, American Welding Society, 1991, Chap. 29, "Other Welding Processes", pp.892-900.
Broco Systems Ultra-Thermic rod Brochure, 2 pages.

*Primary Examiner*—Stephen J. Novosad
*Attorney, Agent, or Firm*—Weingarten, Schurgin, Gagnebin & Hayes

[57] ABSTRACT

An apparatus and method for capping a burning or blown out oil or gas well are disclosed. A pipe is placed over a flange and casing on a wellhead and welded thereto using thermite welding. The thermite reaction occurs in one or more crucibles mounted to the pipe. Graphite feeders direct the molten metal produced by the reaction into apertures near the bottom of the central pipe. The feeders join the pipe at an angle such that the molten metal flows into the annular space between the interior of the pipe and the wellhead structure in a generally circular flow pattern. A malleable clamp to conform to the configuration of the pipe and flange is provided to hold the pipe in place over the flange and act as a mold for the molten metal during the welding process. After the weld has formed, a valve in the pipe is closed, which simultaneously shuts off the flow of oil and extinguishes the fire by depriving it of oil, its fuel.

48 Claims, 6 Drawing Sheets

APPARATUS AND METHOD FOR CAPPING OIL OR GAS WELLS

FIELD OF THE INVENTION

This invention relates to the field of oil or gas wells and more particularly to extinguishing well fires and capping the wells.

BACKGROUND OF THE INVENTION

A typical oil well structure includes a wellhead, to which are attached the various casings and the tubing through which the oil flows. A structure known as a "Christmas tree" is mounted above the wellhead. It provides various gauges and valves, including those through which the flow of oil is directed.

Blowouts and burning oil wells are a serious environmental hazard and a waste of oil, a limited energy source. Traditionally, oil well fires are extinguished by holding a chimney or flare stack and explosives on top of the wellhead. The chimney and explosives are carried at the end of a long boom on a crane. The explosives are remotely detonated, causing an explosion which extinguishes the fire by depriving it of oxygen. The chimney is removed and a new christmas tree is placed on the wellhead to stop the uncontrolled release of oil.

The vicinity of a burning oil well is extremely hot and frequently cluttered with debris, particularly if the wellhead was blown up by explosives or otherwise damaged, as happened to oil wells in Kuwait during the Gulf War. Before the fire can be extinguished using the explosive method, the area must be cleaned of debris, using bulldozers, explosives, or large fans. This process is dangerous and requires fire fighters to approach the burning well fairly closely. To let the fire fighters to get close enough to the wells to work on them, the area must be cooled with water. Frequently, the water must be brought to the site in tankers and sprayed onto the area. Large quantities of water are used.

Even when the fire is finally extinguished, oil still flows from the well, particularly from a well under pressure. The well must be recapped with a new, precisely machined christmas tree. If the wellhead has been damaged, it must be repaired first. Only when the christmas tree is in place may its valves be closed, stopping the flow of oil.

Another known method for extinguishing a fire is the injection of a drilling mud/water mixture into the well to block it. This method may also be employed if the explosion failed to extinguish the fire. Afterward, the well must be cleaned out before it can become operational.

A new Christmas tree generally must be attached at a clean, intact flange. If the casing has been damaged, it must be repaired or replaced before a new Christmas tree can be attached.

A further method for extinguishing a burning well uses thermite welding to attach a pipe over the wellhead. Thermite welding is a known welding technique which utilizes the reduction of a metal oxide with aluminum, known as a Goldschmidt reaction. In the thermite welding reaction, iron oxide and aluminum in powdered form are mixed. To initiate the reaction, this composition is heated to ignite the powder. The products react to form aluminum oxide and iron. The heat produced by this reaction is sufficient to melt the resultant products. The molten iron is then used as a filler metal in a weld.

In using thermite welding to extinguish a wellhead fire, a pipe is placed over the wellhead. A thermite charge is placed directly at the location where the weld is desired, such as in the interior of the pipe adjacent the wellhead. The thermite composition is ignited and produces molten metal. The pipe functions as a chimney for the fire, and a valve, previously disposed in the pipe, is used to close off the flow of oil. This method extinguishes the fire, by depriving it of fuel, and caps the flow of oil in a single step. However, in this method, the pipe must be placed on the ground and attached to the wellhead with a member such as a ring, which renders it difficult to fit over most actual wellheads. Also, the molten metal tends not to fill the area between the wellhead and pipe uniformly and the slag is not eliminated from the molten metal, resulting in a weaker weld. Further, the parts to be welded cannot be preheated, which is desirable for a strong bond between the existing parts and the filler metal.

SUMMARY OF THE INVENTION

The present invention provides an improved system for extinguishing and capping a burning oil well in a single step using thermite welding. First, the wellhead is removed at a level somewhat above the uppermost suitable flange. A capping device comprising a pipe, having an open lower end and a valve near the upper end, is placed over the flange and casing on the wellhead for subsequent welding thereto. The pipe is provided in a size which corresponds to the periphery of the flange. A crucible contains a thermite composition and small pieces of steel. Other additives, such as rare earth metal salts, may also be included. A graphite feeder extends from the bottom of the crucible to an aperture in the wall of the pipe near the bottom of the pipe. The pipe and crucible are carried on the end of a boom for remote manipulation.

A clamp is provided to surround the flange and lower end of the pipe. As the clamp, mounted on the end of a boom, is guided into position, it also guides the pipe into a proper fit over the flange. The clamp forms a cavity which is filled with a malleable material that can withstand high temperatures. This material conforms to the shape of the flange and bolts and fills the spaces between the interior of the clamp and the wellhead structure and pipe. This material acts as a mold for the steel, preventing the molten steel from leaking out of the area of the weld, thus ensuring a better weld.

The thermite composition in the crucible is ignited by a remotely controlled ignition member. The thermite reaction produces molten steel in the crucible. The crucible allows the slag to rise to the top of the steel. A meltable timing plug in the bottom of the crucible melts after a short period of time, allowing the steel to flow through the graphite feeder into the interior of the pipe to surround the casing or tubing extending from the wellhead. Slag (including $Al_2O_3$) from the thermite reaction generally remains in the crucible and does not form a part of the weld. The graphite feeders attach to the pipe at an angle to the pipe's surface such that the steel enters the interior of the pipe in a generally circular manner. This flow pattern allows the steel to flow around the annular space, providing a better fill and preheating the parts to be welded. The steel subsequently cools and forms a weld attached to the pipe, casing, flange, and bolts on the flange.

The system of the present invention can be practiced in addition to or in place of traditional methods. With the present system, the fire fighters do not need to get as close to the wellhead fire and fewer fire fighters are needed. Little or no preparation of the wellhead is needed and the capping device can be attached to a damaged wellhead. A stronger, more uniform weld is provided and the wellhead structure is not damaged by introduction of the molten metal. The weld can occur in the presence of liquids or contaminants. The well is killed more rapidly than in prior art methods in which the fire is put out separately. A Christmas tree can be subsequently attached to the capping device of the present invention, or the capping device can be removed and replaced with a Christmas tree.

DESCRIPTION OF THE DRAWINGS

The invention will be more fully understood from the following detailed description taken in conjunction with the accompanying drawings in which.

DETAILED DESCRIPTION OF THE INVENTION

Figure 1:
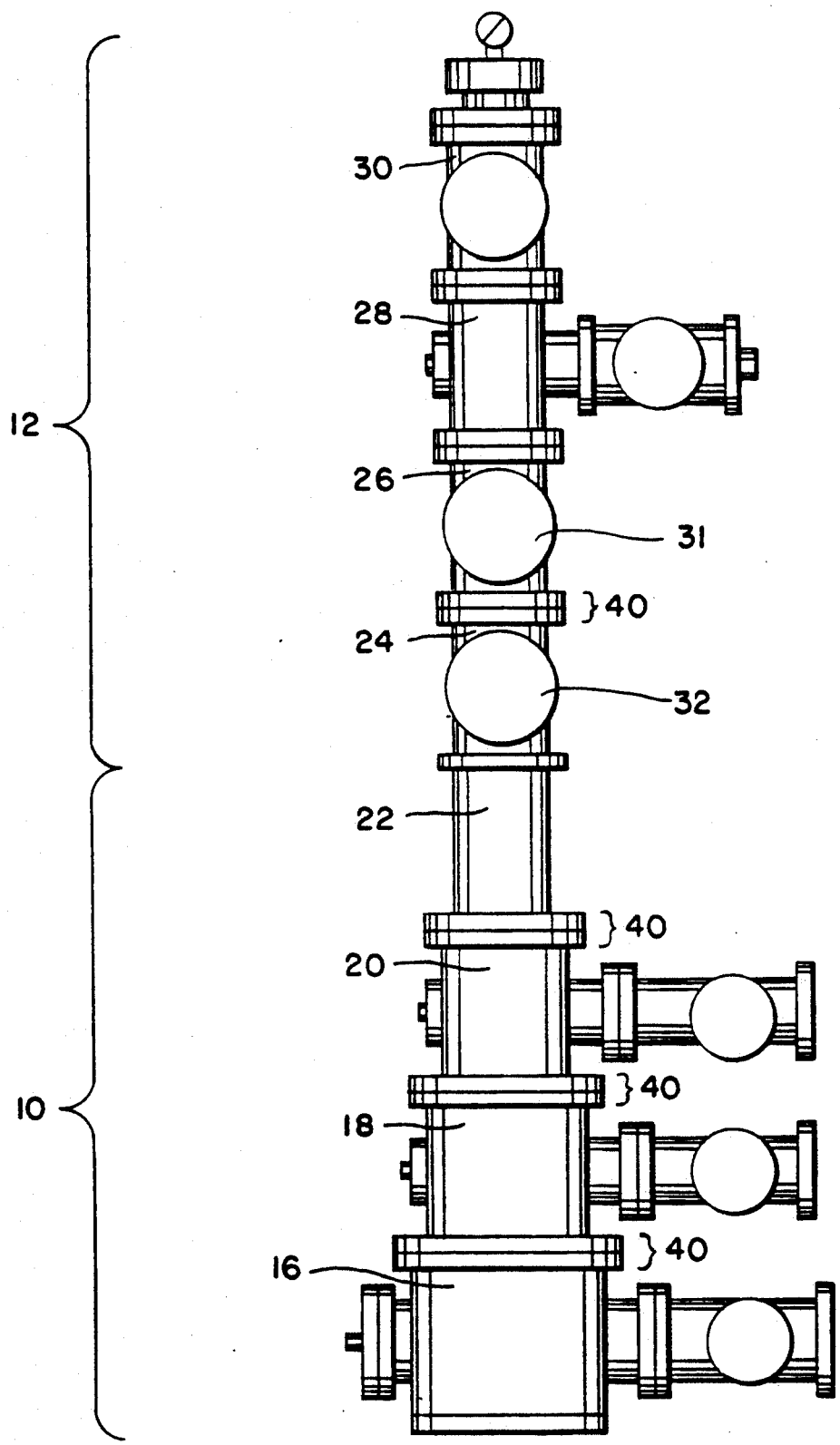
FIG. 1 is a schematic view of a typical wellhead structure.

A typical wellhead structure is shown generally in FIG. 1. The wellhead structure includes a wellhead 10 and a christmas tree 12. The wellhead 10 generally consists of several components, including a casing head body 16, a casing head spool 18, a tubing head spool 20, and a tubing head adapter 22. Concentrically arranged casings and tubing (not shown) extend from the oil field below the surface into the wellhead structure and are connected to these components. Valves and/or gauges generally are provided on these components.

The christmas tree 12 is mounted on the wellhead 10 at the tubing head adaptor 22. The Christmas tree also comprises a number of components, 24, 26, 28, 30, each of which may contain one or more valves or gauges. The oil from the well flows through the interior tubing and is drawn out through one or more valves 32, 34 on the christmas tree.

The wellhead and christmas tree components are stacked vertically one on top of another. As shown more particularly in FIG. 2, adjacent components are fastened with pairs 40 of abutting flanges 42, 44 held together by nuts 46 threaded on both ends of a screw 48 inserted through aligned holes in the flanges 42, 44. The flanges 42, 44 generally are formed of cast iron and the nuts 46 and screws 48 of steel.

Figure 2:
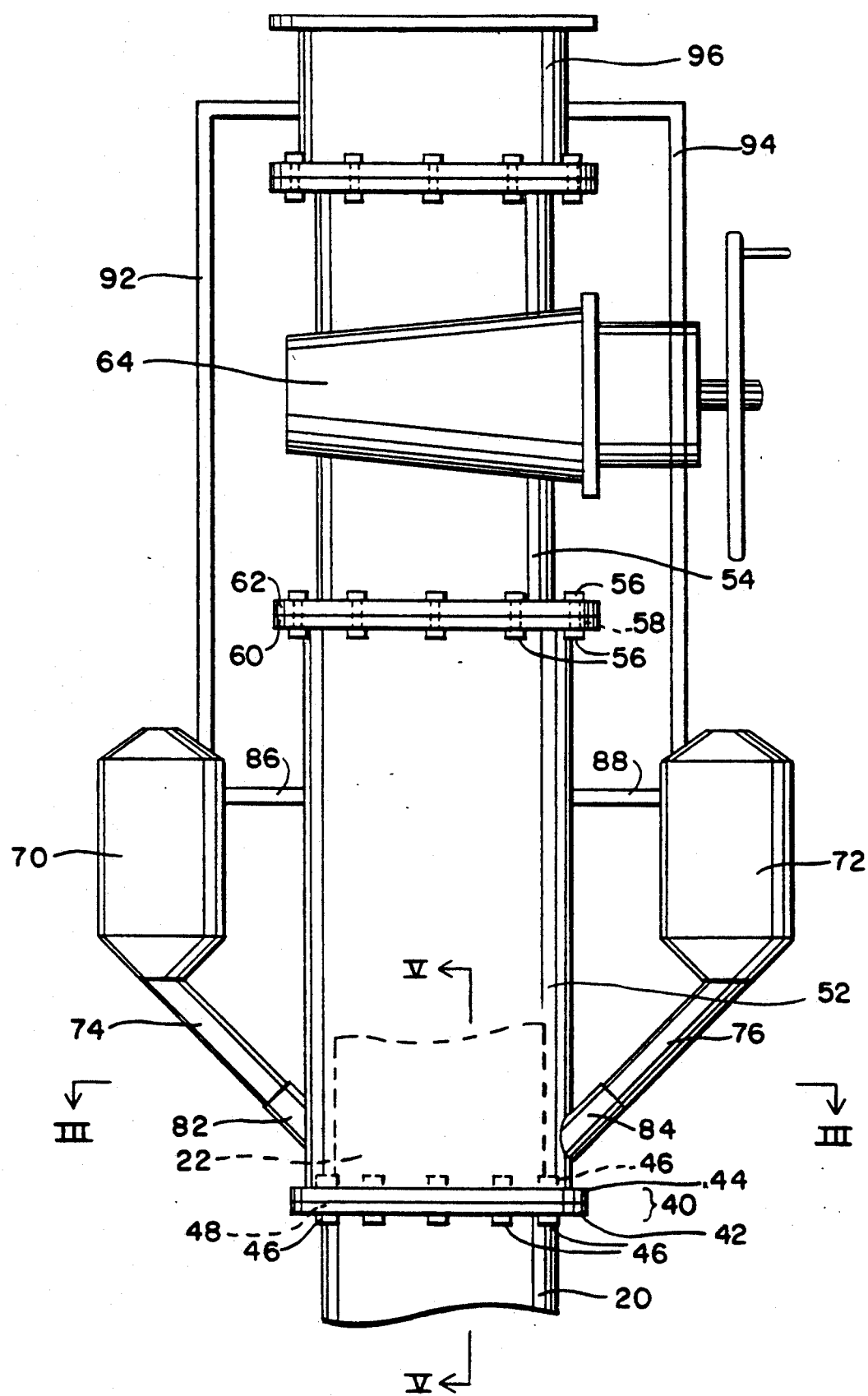
FIG. 2 is a view of the capping apparatus according to the present invention.

To extinguish an oil well fire, the destroyed structure is first cut off at a level above the first suitable flange on the wellhead, which is generally the first intact flange, leaving a small portion or stub of the upper component. For example, as shown in FIG. 2, if only the christmas tree has been destroyed, the structure may be cut off at the level of the flange 44 on the tubing head adapter 22, leaving a portion of the tubing head adapter 22. The structure may be cut using any known prior art cutting method, such as a cutting wire, a water jet, or a thermite cutting apparatus. The cutting may be controlled remotely if necessary, with the cutting apparatus mounted on the end of a boom.

Next, the capping apparatus of the present invention, shown generally at 50 in FIG. 2, is mounted on the end of a boom (not shown) for remote manipulation. Alternatively, the capping apparatus may be supported in any other suitable manner, such as by an air lifting device maneuvered by helicopter. The capping apparatus 50 comprises a cylindrical steel pipe section 52 of a size to fit generally around the periphery of the upper flange 44 of the abutting pair 40 of flanges.

A valve section 54 may be mounted above the cylindrical pipe section 52. The valve section 54 and the cylindrical pipe section 52 are fastened by nuts 56 and screws 58 through abutting flanges 60, 62. The valve section 54 includes a valve 64, which may comprise any suitable type of valve, such as a gate valve. The valve may also be integrated within the pipe section 52 if desired. Alternatively, another device, such as a blow out preventer, or no device may be mounted above the pipe section.

A pair of crucibles 70, 72, in which the thermite reaction occurs, are mounted to the cylindrical pipe section 52. The crucibles may be of any known type suitable for containing molten metal. Each crucible has an opening in the bottom which is temporarily closed by a meltable timing plug (not shown) of any suitable type. A feeder 74, 76 extends from the bottom of each crucible 70, 72. Each feeder is generally tubular and leads to an aperture in the wall of the cylindrical pipe section 52 located proximate the bottom of the pipe section. Preferably, the feeders 74, 76 are made from graphite for good heat and fire resistance and to provide a surface to which the molten metal will not adhere. Other materials, such as carbon composites, SiC, BN, or ceramic materials such as carbides, borides, or silicates may be used as well. Sockets 82, 84 are attached to the cylindrical pipe section 52 adjacent the apertures for receiving the feeders. Preferably, the crucibles 70, 72 are mounted to the cylindrical pipe section 52 by struts 86, 88 welded to the crucibles and to the pipe section. Any other suitable manner of supporting the crucibles may be used. For example, the crucibles may be integrally formed with the pipe section. Similarly, while a pair of crucibles are shown, only one crucible or three or more crucibles, with corresponding feeders and apertures in the pipe section, may be provided if desired.

Figure 4:
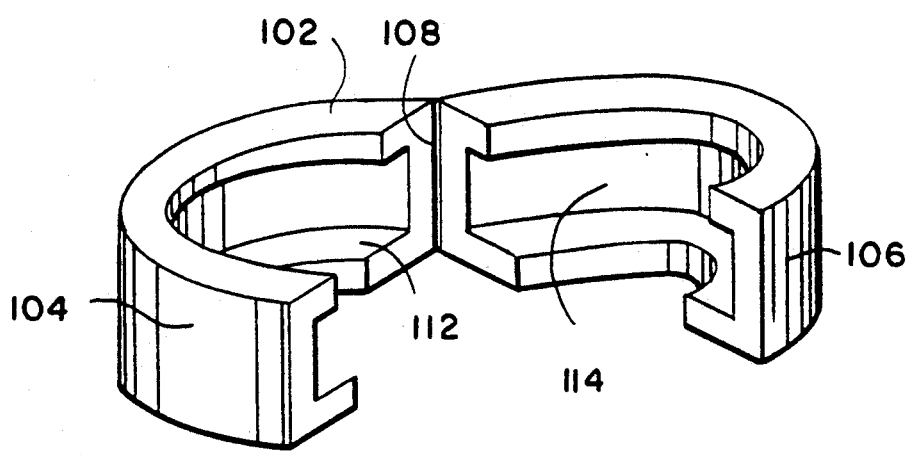
FIG. 4 is a perspective view of a clamp according to the present invention.
Figure 5:
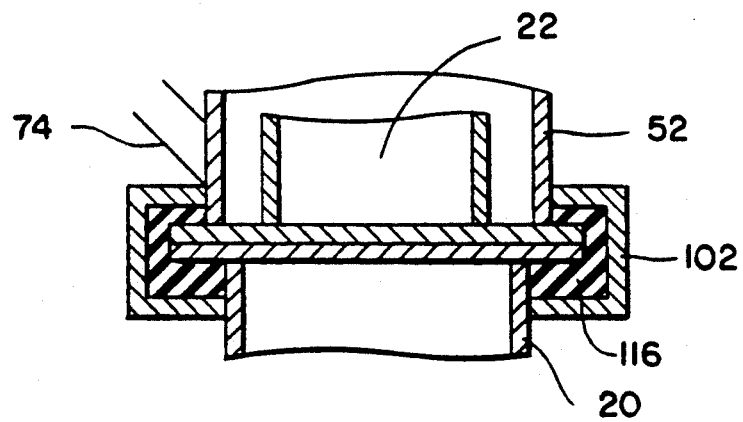
FIG. 5 is a cross-sectional view taken through line V—V of FIG. 2 showing a clamp in use according to the present invention.

Referring to FIGS. 4 and 5, a clamp 102 is provided which fits around the outside of the pair of flanges 42, 44 and the lower end of the cylindrical pipe section 52. The clamp 102 has a clamshell configuration, having two arms 104, 106 joined along a common hinge 108. Each arm of the clamp forms an interior cavity 112, 114 which is filled with a malleable, fire resistant material 116 that is able to withstand high temperatures. Materials such as graphite, asbestos, bentonite, or another suitable clay may be used. As shown in FIG. 5, the malleable material conforms to the irregular configuration of the flanges and the cylindrical pipe section, squeezing into crevasses. The material acts as a mold to retain the molten metal within the annular space while it cools, thereby ensuring a stronger weld. The clamp may be provided in any configuration to suit the field conditions.

The clamp 102 is preferably mounted on a boom (not shown) and is maneuvered into position remotely by manipulation of a suitable mechanism to operate the hinged arms 104, 106. As the clamp is positioned, it engages the cylindrical pipe section 52 and ensures that the cylindrical pipe section is properly seated squarely over the flange 44. During the welding process, the clamp 102 holds the cylindrical pipe section in place.

Figure 6:
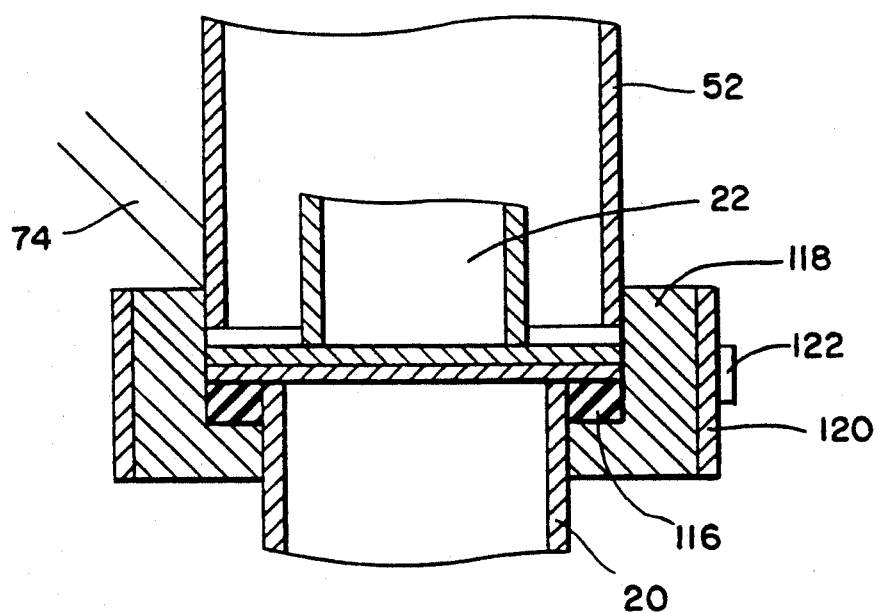
FIG. 6 is a cross sectional view of a further embodiment of a clamp according to the present invention.

A further embodiment of the clamp is shown in FIG. 6. The clamp 118 is formed with an adjustable metal band 120 which is tightened with any suitable adjusting mechanism 122 about the pipe section and wellhead. FIG. 6 also shows an alternative configuration of the clamp and fit of the pipe section 52 over the flange of the wellhead. The clamp may also comprise clothlike material, for example an asbestos cloth folded around graphite which is wrapped about the wellhead and pipe section and held in place by a metal strap. The cloth may be covered with clay or a similar material to fill in the irregularities in the wellhead and pipe sections and aid in sealing.

Although other known suitable reactions may be used, the preferred thermite reaction for use in the present invention is as follows:

$$Fe_2O_3 + 2Al \rightarrow Al_2O_3 + 2Fe + heat$$

Each crucible contains a thermite composition comprising powdered Al and $Fe_2O_3$. This thermite composition is commercially available in twenty-five pound charges. The amount of thermite to be used depends on field conditions and is determined from the volume of metal required in the weld. Preferably, six times the volume of thermite is used per unit volume of metal desired. Other products may be added to the thermite. For example, rare earth metal salts may be included to remove sulfur in the oil, since the presence of sulfur weakens the weld.

The reaction is initiated by heating the thermite composition to its ignition temperature, for example with a magnesium ribbon type igniter inserted in the composition. The igniter is remotely controlled. Any other suitable igniter may be used.

The reaction generates heat and raises the temperature high enough to produce a molten metal. Preferably, small pieces of steel are included in the thermite composition, so that molten steel is produced. The steel forms a stronger weld and also lowers the temperature of the thermite reaction, which occurs at approximately 2500°-3000° C. Steel is also provided by the pipe itself. Slag from the thermite reaction ($Al_2O_3$) rises to the surface of the steel in the crucible. Exhaust gases are vented through conduits 92, 94 to an exhaust section 96 mounted above the valve section 54.

The timing plug in the bottom of each crucible melts after a short period of time, sufficient to allow the thermite reaction to take place and raise the molten metal to the desired temperature. The molten steel flows out of the crucible, through the graphite feeder, and through the aperture in the cylindrical pipe section 52. The steel surrounds the stub of the tubing head adapter 22 and the nuts 46 and fills the annular space at the bottom of the cylindrical pipe section. When the steel cools and hardens, it forms a weld, attaching the pipe section to the flange, nuts, and tubing or casing.

Figure 3:
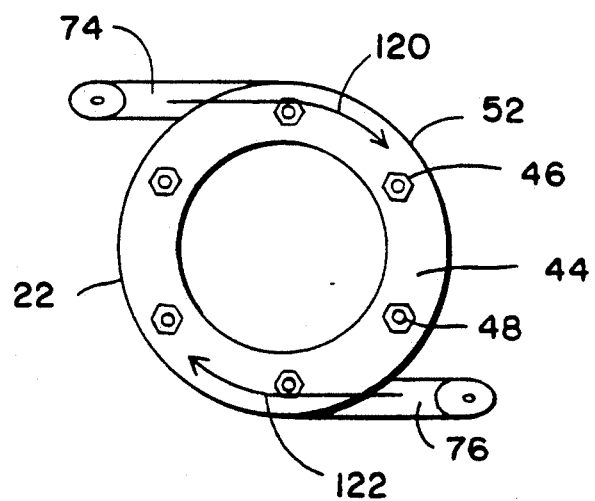
FIG. 3 is cross-sectional view taken through line III—III of FIG. 2.

Referring to FIG. 3, the apertures and sockets 82, 84 are oriented such that the feeders 74, 76 join the pipe section 52 generally tangentially and the molten steel flows into the annular space within the cylindrical pipe section in a circular flow pattern, as shown by arrows 120, 122. Also, the apertures and sockets are placed near the bottom of the pipe section 52, so that the molten steel enters at generally the depth of the weld. In this manner, the steel tends to provide a more uniform fill, which ensures a stronger weld. Additionally, the steel enters the annular space with a large force which is strong enough to cut through the steel of the tubing head adapter 22 if allowed to enter radially and impact directly upon the tubing head adapter 22. Further, by circling around the annular space, the molten steel preheats the tubing head adapter 22, flange 44, and nuts 46, which also provides for a stronger weld. Although the molten metal is indicated as flowing in a clockwise direction in FIG. 3, the feeders and sockets could be oriented so that the molten metal flows counterclockwise, if desired.

The area of the weld may also be preheated in other manners. For example, a coil of wire may be provided around the pipe section. The wire is connected at both ends to a power source to supply a current to run through the wire. The preheating may be provided by a chemical reaction, which may be the thermite reaction or an additional exothermic chemical reaction.

As the molten metal cools, debris and contaminants on the wellhead rise to the surface of the molten metal and form a slag layer thereon. The slag layer does not adversely affect the strength of the weld.

Once the steel has cooled and hardened, the clamp 102 is removed. The pipe sections 52, 54, 96, form a chimney above the well, directing the oil and fire through the cylindrical pipe section 52 and the valve section 54. At this point, the valve 64 in the valve section 54 is closed, which closes off the flow of oil. Once the flow of oil is cut off, the fire runs out of fuel and stops burning. Accordingly, the present invention both puts out the fire and caps the well in a single operation.

After the fire has been extinguished, the capping apparatus 50 may remain in place and a new christmas tree may be attached above the valve section 54 or exhaust section 96. Alternatively, the apparatus 50 may be removed by removing the nuts 46 from the lower flange 42 and lifting the apparatus 50 and the upper flange 44 away. A new Christmas tree may then be placed on the wellhead.

Although the invention has been described in conjunction with an oil well, it is applicable to gas wells also.

The invention is not to be limited by what has been particularly shown and described, except as indicated in the appended claims.

We claim:

1. A system for capping a well, comprising:
   a pipe dimensioned to fit over a section of a wellhead, the pipe having an open lower end and at least one aperture in the wall of the pipe near the lower end of the pipe;
   a crucible containing a thermite composition;
   a feeder extending from the bottom of the crucible to the aperture in the pipe;
   means for supporting the crucible and the pipe over the section of the wellhead; and
   an ignition member to start a thermite reaction from the thermite composition, whereby molten metal from the thermite reaction flows through the feeder to the interior of the pipe to form a weld interconnecting the pipe and the wellhead.

2. The apparatus of claim 1, wherein the feeder is formed of a flame retardant, non-combustible material.

3. The apparatus of claim 2, wherein the feeder is formed of graphite.

4. The apparatus of claim 2, wherein the feeder is formed of a carbon composite.

5. The apparatus of claim 2, wherein the feeder is formed of a ceramic material.

6. The apparatus of claim 1, wherein the feeder is generally tubular.

7. The apparatus of claim 1, wherein the feeder joins the aperture in the wall of the pipe at an angle to the wall of the pipe to introduce the molten metal into the interior of the pipe in a generally circular flow pattern.

8. The apparatus of claim 1, wherein the aperture in the wall of the pipe is proximate the lower end of the pipe to be at the depth of the weld.

9. The apparatus of claim 1, wherein the supporting means comprises a boom.

10. The apparatus of claim 1, wherein the supporting means comprises an air lifting device.

11. The apparatus of claim 1, wherein the supporting means comprises means for remotely maneuvering the pipe and crucible into position over the wellhead.

12. The apparatus of claim 1, wherein the crucible is supported on the pipe by an arm extending from the pipe.

13. The apparatus of claim 1, wherein the crucible is integral with the pipe.

14. The apparatus of claim 1, further comprising a remote controller for igniting the ignition member.

15. The apparatus of claim 1, further comprising a valve mounted to the top of the pipe.

16. The apparatus of claim 1, further comprising a valve within the pipe.

17. The apparatus of claim 1, further comprising a blow out preventer mounted to the top of the pipe.

18. The apparatus of claim 1, further comprising a clamp to hold the pipe over the wellhead and form a mold for the molten metal.

19. The apparatus of claim 18, wherein the clamp has a clamshell configuration comprising two arms hinged together.

20. The apparatus of claim 18, wherein the clamp forms an interior cavity and a malleable material is disposed in the cavity, whereby the malleable material conforms to the configuration of the wellhead structure and the pipe when the clamp is positioned to hold the pipe over the wellhead.

21. The apparatus of claim 20, wherein the malleable material is one of a clay, asbestos, and graphite.

22. The apparatus of claim 21, wherein the clay is bentonite.

23. The apparatus of claim 18, wherein the clamp comprises an adjustable band.

24. The apparatus of claim 18, wherein the clamp comprises a conformable material and an adjustable band for holding the conformable material about the wellhead and pipe.

25. The apparatus of claim 1, wherein the thermite composition comprises iron oxide and aluminum in powdered form.

26. The apparatus of claim 1, wherein pieces of steel are mixed into the thermite composition.

27. The apparatus of claim 1, wherein the thermite reaction is $$Fe_2O_3 + 2Al \rightarrow Al_2O_3 + 2Fe$$

28. The apparatus of claim 1, wherein salts of rare earth metals are added to the thermite composition.

29. The apparatus of claim 1, further comprising a plurality of crucibles each containing a thermite composition and an ignition member, a plurality of apertures formed in the wall of the pipe, and a plurality of feeders extending from each crucible to a corresponding aperture.

30. The apparatus of claim 29, wherein each feeder joins its corresponding aperture in the wall of the pipe at an angle to the wall of the pipe to introduce the molten metal into the interior of the pipe in a generally circular flow pattern.

31. The apparatus of claim 1, wherein the pipe is dimensioned to fit on the periphery of a flange on the wellhead.

32. The apparatus of claim 1, wherein the pipe is dimensioned to fit around a casing on the wellhead.

33. A method for capping a well, comprising:
providing a pipe having an open lower end and at least one aperture in the wall of the pipe near the open lower end of the pipe, the pipe so dimensioned that the open lower end of the pipe corresponds to a section of a wellhead;
placing the pipe over the section of the wellhead;
providing a thermite composition in a crucible;
igniting the thermite composition to start a thermite reaction;
introducing molten metal produced in the thermite reaction into the interior of the pipe through the aperture in the pipe; and
allowing the molten metal to solidify to form a weld fastening the pipe to the wellhead.

34. The method of claim 33, further comprising removing a portion of the wellhead at a location above a flange on the wellhead.

35. The method of claim 34, wherein the pipe is dimensioned to correspond to the periphery of the flange.

36. The method of claim 33, further comprising providing a valve in the pipe; and closing the valve in the pipe after the weld has formed.

37. The method of claim 33, further comprising introducing the molten metal into the interior of the pipe in a generally circular flow pattern.

38. The method of claim 33, further comprising clamping the pipe to the wellhead over the flange prior to igniting the thermite composition.

39. The method of claim 33, further comprising providing a clamp having a cavity therein, providing a malleable material in a cavity, and clamping the pipe to the wellhead over the flange prior to igniting the thermite composition to provide a mold for the molten metal formed from the malleable material.

40. The method of claim 33, further comprising preheating the wellhead and the pipe.

41. The method of claim 40, wherein the preheating is provided by the flow of molten metal in a generally circular pattern around the interior of the pipe.

42. The method of claim 40, wherein
the preheating is provided by induction heating.

43. The method of claim 42, wherein
the preheating is provided by a coil of wire around the wellhead.

44. The method of claim 40, wherein
the preheating is provided by an exothermic chemical reaction.

45. The method of claim 44, wherein
the exothermic chemical reaction is the thermite reaction.

46. The method of claim 33, wherein
the wellhead section is removed by cutting with a thermite cutting apparatus.

47. The method of claim 33, further comprising
providing pieces of steel in the crucible.

48. The method of claim 33, further comprising
providing salts of rare earth metals in the crucible.

* * * * *